United States Patent
Gow

(10) Patent No.: US 10,140,670 B2
(45) Date of Patent: Nov. 27, 2018

(54) ENERGY MANAGEMENT METHODS AND SYSTEMS BASED ON FINANCIAL IMPACT

(75) Inventor: Philippe Hart Gow, Sunnyvale, CA (US)

(73) Assignee: ENGIE Storage Services NA LLC, Santa Clara, CA (US)

( * ) Notice: Subject to any disclaimer, the term of this patent is extended or adjusted under 35 U.S.C. 154(b) by 577 days.

(21) Appl. No.: 13/601,777

(22) Filed: Aug. 31, 2012

(65) Prior Publication Data

US 2014/0067140 A1 Mar. 6, 2014

(51) Int. Cl.
*G06Q 50/06* (2012.01)
*H02J 3/00* (2006.01)

(52) U.S. Cl.
CPC ............... *G06Q 50/06* (2013.01); *H02J 3/00* (2013.01)

(58) Field of Classification Search
USPC ........................................................ 700/291
See application file for complete search history.

(56) References Cited

U.S. PATENT DOCUMENTS

| | | | |
|---|---|---|---|
| 1,831,553 A | 11/1931 | Byles | |
| 4,023,043 A | 5/1977 | Stevenson | |
| 4,277,691 A | 7/1981 | Lunn | |
| 4,520,274 A | 5/1985 | Stants | |
| 4,731,547 A * | 3/1988 | Alenduff et al. | 307/85 |
| 5,500,561 A * | 3/1996 | Wilhelm | 307/64 |
| 5,816,491 A | 10/1998 | Berkeley | |
| 6,037,758 A | 3/2000 | Perez | |
| 6,067,482 A | 5/2000 | Shapiro | |
| 6,476,519 B1 | 11/2002 | Weiner | |
| 6,542,791 B1 | 4/2003 | Perez | |
| 6,652,330 B1 | 11/2003 | Wasilewski | |

(Continued)

FOREIGN PATENT DOCUMENTS

| | | |
|---|---|---|
| WO | 2017035258 A1 | 3/2017 |
| WO | 2017040586 A1 | 3/2017 |

(Continued)

OTHER PUBLICATIONS

Pedrasa et al., "Robust Scheduling of Residential Distributed Energy Resources Using a Novel Energy Service Decision-Support Tool" Innovative Smart Grid Technologies (ISGT), Jan. 17-19, 2011 IEEE PES, pp. 1-8.*

(Continued)

*Primary Examiner* — Emilio J Saavedra
(74) *Attorney, Agent, or Firm* — Dorsey & Whitney LLP

(57) ABSTRACT

Energy management methods and systems based on financial impact are disclosed herein, wherein an energy management system at a site monitors metered energy consumption, establishes a peak consumption level, determines whether energy consumption will result in an increased peak consumption level, and if it will, calculates the financial value and costs of mitigating an increase in the peak consumption level, including an increase in demand charge prospectively avoided, and mitigates the peak in consumption to the peak consumption level using an energy storage system or other energy providing device if the value of mitigating the peak offsets the inherent costs. Embodiments may further use confidence factors or incremental changes to a peak consumption level to optimize the process and utilize energy devices to their greatest effectiveness.

7 Claims, 7 Drawing Sheets

(56) References Cited

U.S. PATENT DOCUMENTS

| | | |
|---|---|---|
| 6,785,592 B1 | 8/2004 | Smith et al. |
| 6,889,122 B2 | 5/2005 | Perez |
| 6,900,556 B2 | 5/2005 | Provanzana et al. |
| 6,902,837 B2 | 6/2005 | McCluskey et al. |
| 7,060,379 B2 | 6/2006 | Speranza et al. |
| 7,142,949 B2 | 11/2006 | Brewster et al. |
| 7,193,872 B2 | 3/2007 | Siri |
| 7,274,975 B2 | 9/2007 | Miller |
| 7,782,021 B2 | 8/2010 | Kelty |
| 7,894,946 B2 | 2/2011 | Kulyk |
| 9,007,027 B2 | 4/2015 | Prosser |
| 9,048,671 B2 | 6/2015 | Prosser |
| 9,235,825 B2 | 1/2016 | Shao |
| 2001/0043013 A1 | 11/2001 | Abe |
| 2005/0043862 A1 | 2/2005 | Brickfield et al. |
| 2007/0103835 A1 | 5/2007 | Sorenson |
| 2008/0114499 A1* | 5/2008 | Hakim et al. .......... 700/291 |
| 2008/0203975 A1 | 8/2008 | Burlak et al. |
| 2009/0048716 A1* | 2/2009 | Marhoefer .......... 700/291 |
| 2009/0157529 A1 | 6/2009 | Ehlers et al. |
| 2009/0212745 A1 | 8/2009 | Kelty |
| 2009/0216688 A1 | 8/2009 | Kelty |
| 2009/0254396 A1 | 10/2009 | Metcalfe |
| 2010/0271802 A1 | 10/2010 | Recker et al. |
| 2010/0295514 A1 | 11/2010 | Burlak et al. |
| 2011/0137481 A1 | 6/2011 | Manz |
| 2012/0130556 A1* | 5/2012 | Marhoefer .......... 700/291 |
| 2012/0242148 A1 | 9/2012 | Galati |
| 2012/0245744 A1 | 9/2012 | Prosser et al. |
| 2013/0018821 A1 | 1/2013 | Shao |
| 2013/0232151 A1 | 9/2013 | Shao |
| 2013/0274935 A1* | 10/2013 | Deshpande et al. .......... 700/291 |
| 2013/0325197 A1* | 12/2013 | Mansfield ........ H02J 3/32 700/291 |
| 2015/0295449 A1 | 10/2015 | Prosser |
| 2016/0006245 A1 | 1/2016 | Chow |
| 2016/0161932 A1 | 6/2016 | Shao |
| 2017/0060162 A1 | 3/2017 | Holzman et al. |
| 2017/0063083 A1 | 3/2017 | Holzman |
| 2017/0098229 A1 | 4/2017 | Vickery et al. |
| 2017/0098279 A1 | 4/2017 | Vickery et al. |
| 2017/0099056 A1* | 4/2017 | Vickery ........... G05B 13/0255 |

FOREIGN PATENT DOCUMENTS

| | | |
|---|---|---|
| WO | 2017059340 A1 | 4/2017 |
| WO | 2017059345 A1 | 4/2017 |
| WO | 2017059350 A1 | 4/2017 |

OTHER PUBLICATIONS

Craft, David, "Local energy management through mathematical modeling and optimization" Massachusetts Institute of Technology Doctorate Thesis, Sep. 2004, 223 Pgs.*

Norris, et al., "NAS Battery Demonstration at American Electric Power: A Study for the DOE Energy Storage Program" Sandia National Laboratories, Mar. 2007, 55 Pgs.*

* cited by examiner

ENERGY MANAGEMENT METHODS AND SYSTEMS BASED ON FINANCIAL IMPACT

BACKGROUND

The present invention is directed to the fields of energy consumption and power optimization and management methods, software, computer-readable media, apparatuses, and systems, and related fields.

Energy consumption management is a growing field in which the energy consumption of electrical utility customers is controlled to avoid or minimize costs on an electrical bill, to protect the environment, and to improve distribution grid stability, power quality, and reliability. One means by which customers have managed energy consumption is a system of load controlling devices such as system controllers, generators, and energy storage devices connected to the electrical system at the customer site in order to manipulate the amount of energy consumption recorded by power meters of the utility provider. By doing so, the billed energy consumption of the site and peak demand charges can be dramatically reduced, resulting in significant savings to the consumer and ancillary benefits to the utility provider and the grid as a whole.

However, energy management system components are expensive investments for consumers, and their misuse can thwart any savings that could be otherwise attainable through proper use. As an illustration of this point, if an energy storage device is depleted by mitigating energy consumption during a period of inexpensive electricity prices, it may not be able to then be used to mitigate energy consumption during a period of expensive electricity prices. Furthermore, there are costs to the consumer associated with the price of energy during recharging of the energy storage device and wear and tear on the device due to these actions. Thus, there is a need for management devices and methods that control energy consumption at a site while taking anticipated costs properly into account, and a need for systems capable of more fully maximizing the efficient use of energy consumption management devices.

BRIEF SUMMARY

In some embodiments described here, a method of managing electrical energy consumption of a consumer is set forth. The method comprises: determining that an energy consumption level of a site will result in an increase to a peak consumption level; calculating a financial value of discharging an energy source at the site and thereby mitigating the increase in the peak consumption level, the financial value including a factor representing at least one demand charge increase prospectively avoided by mitigating the increase in the peak consumption level; calculating a financial cost of mitigating the increase in the peak consumption level; and providing energy from the energy source to mitigate the increase in the peak consumption level if the financial value at least offsets the financial cost of mitigating the increase in the peak consumption level.

This method may allow energy consumers to accurately account for the effects that operating an energy source such as an electrical energy storage system (ESS) or electrical generator will have on peak consumption, demand charges, and related concerns.

In some embodiments, the energy consumption level of the site is the total level of energy consumption from a utility distribution grid at the site.

In some embodiments, the financial value includes a value selected from the group consisting of: (1) the value obtained by discharging energy from the energy source to power a load during the peak instead of drawing the energy for that load from the distribution grid, (2) the value gained by the consumer by discharging the energy source to result in a sale of energy to a utility provider, and (3) the value gained by the consumer by discharging the energy source to participate in a demand response program.

In some embodiments, the financial cost includes a cost selected from the group consisting of: (1) the cost of energy in recharging the amount of energy discharged from the energy source while mitigating the increase in the peak consumption level, and (2) the loss in effective life span of the energy source due to discharging the energy source.

In some embodiments, the financial cost includes the value of an increase in demand charge not avoided by discharging the energy source.

In some embodiments, the method further comprises incrementally increasing the peak consumption level, determining a recalculated financial value and a recalculated financial cost of mitigating an increase in the peak consumption level in line with the incrementally increased peak consumption level, and discharging the energy source to mitigate at the incrementally increased peak consumption level if the recalculated financial value offsets the recalculated financial cost. In some of these embodiments, the peak consumption level is incrementally increased if the financial value does not offset the financial cost of discharging and recharging the energy source, and/or increasing the peak consumption level comprises decreasing a rate of discharge of the energy source for mitigating an increase in the peak consumption level.

In some embodiments the financial value is calculated using a confidence factor to forecast the profitability of mitigating energy consumption over time by calculating the projected financial cost of mitigating peaks expected over time remaining in a billing cycle versus the projected financial value gained mitigating the expected peaks. In some of these embodiments the confidence factor is dependent on the recorded frequency and/or magnitude of peaks in consumption at the site.

In another embodiment, an energy management system is disclosed. This energy management system comprises an energy storage system (ESS) connected via one or more power converters to a customer side of a utility meter at a customer site which is connected via the utility meter to a utility electrical power distribution grid; and a control system comprising algorithmic computer-readable instructions, wherein at least one power converter together with the ESS are controllable by the control system in response to the instructions to supply energy stored by the ESS to the customer side of the utility meter when a financial value of discharging the ESS to mitigate an increase in a peak consumption level of the customer at least offsets the financial cost of discharging and recharging the ESS in such a manner as to mitigate an increase in the peak consumption level, wherein the financial value includes a factor representing at least one demand charge increase prospectively avoided by the discharging of the ESS.

In another embodiment, a non-transitory computer-readable medium comprising computer-readable instructions is disclosed, wherein the instructions, when executed by a computer, perform the steps of: determining that an overall energy consumption level of a site will result in an increase to a peak consumption level; calculating a financial value of discharging an ESS at the site, wherein the discharging mitigates an increase in the peak consumption level and the financial value includes a factor representing at least one demand charge increase prospectively avoided by discharging the ESS; calculating a financial cost of discharging and recharging the ESS in such a manner as to mitigate an increase in the peak consumption level; and discharging the ESS to mitigate the increase in the peak consumption level if the financial value offsets the financial cost.

In some of these embodiments, the energy consumption level of the site is the total level of energy consumption from a utility distribution grid at the site.

In some of these embodiments, the financial value includes a value selected from the group consisting of: (1) the value obtained by discharging energy from the ESS to power a load during the peak instead of drawing the energy for that load from the distribution grid, (2) the value gained by the consumer by discharging the ESS to result in a sale of energy to a utility provider, and (3) the value gained by the consumer by discharging the ESS to participate in a demand response program.

In some of these embodiments, the financial cost includes a cost selected from the group consisting of: (1) the cost of energy in recharging the amount of energy discharged from the ESS while mitigating the increase in the peak consumption level, and (2) the loss in effective life span of the ESS due to discharging the ESS.

In some of these embodiments the financial cost includes the value of an increase in demand charge not avoided by discharging the ESS.

In some of these embodiments the steps further comprise: incrementally increasing the peak consumption level, determining a recalculated financial value and a recalculated financial cost of mitigating an increase in the peak consumption level in line with the incrementally increased peak consumption level, and discharging the ESS to mitigate at the incrementally increased peak consumption level if the recalculated financial value offsets the recalculated financial cost. In some of these embodiments, the peak consumption level is incrementally increased if the financial value does not offset the financial cost of discharging and recharging the ESS, and/or increasing the peak consumption level comprises decreasing a rate of discharge of the ESS for mitigating an increase in the peak consumption level.

Additional and alternative features, advantages, and embodiments of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In addition to the novel features and advantages mentioned above, other objects and advantages of the present invention will be readily apparent from the following descriptions of the drawings and exemplary embodiments, wherein like reference numerals across the several views refer to identical or equivalent features.

DETAILED DESCRIPTION

At the outset it is noted that although the invention is described in multiple various exemplary embodiments and implementations in this document, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any exemplary embodiments described or shown herein.

Managing electrical energy consumption may include general actions including, but not limited to, mitigation and load shedding. Mitigation comprises discharging an energy storage system (ESS) or providing energy from a generation device in such a manner that electricity consumption recorded by the utility meter of the consumer is decreased. This result occurs because the additional energy provided by the ESS or generator at least partially satisfies the consumption requirements of one or more loads at the site, driving down the apparent demand at the meter. Load shedding is a process by which the energy consumption of one or more loads at the site is reduced, thereby directly driving down the recorded consumption of energy seen at the utility meter. Peak mitigation is the use of mitigation and/or load shedding to prevent the metered consumption of a site from exceeding a peak consumption limit.

Utility providers commonly bill consumers for the meter-recorded total energy consumed (e.g., in dollars per kilowatt-hour) at the consumer's site within time limits defined by a billing period, and it is becoming more and more common for providers to also bill a "demand charge" to consumers based on the peak energy consumed (e.g., in dollars per kilowatt) during a billing period. The demand charge can be based on a single peak reading at the meter, or may be based on a peak that is determined by an average consumption over a set period of time (e.g., over a day or a 15-minute window of time) or over a set number of data points collected by the utility meter. For customers that have high peaks in energy consumption, such as locations using high-powered electric vehicle charging systems, demand charges can be a significant portion of their utility bill.

Figure 1:
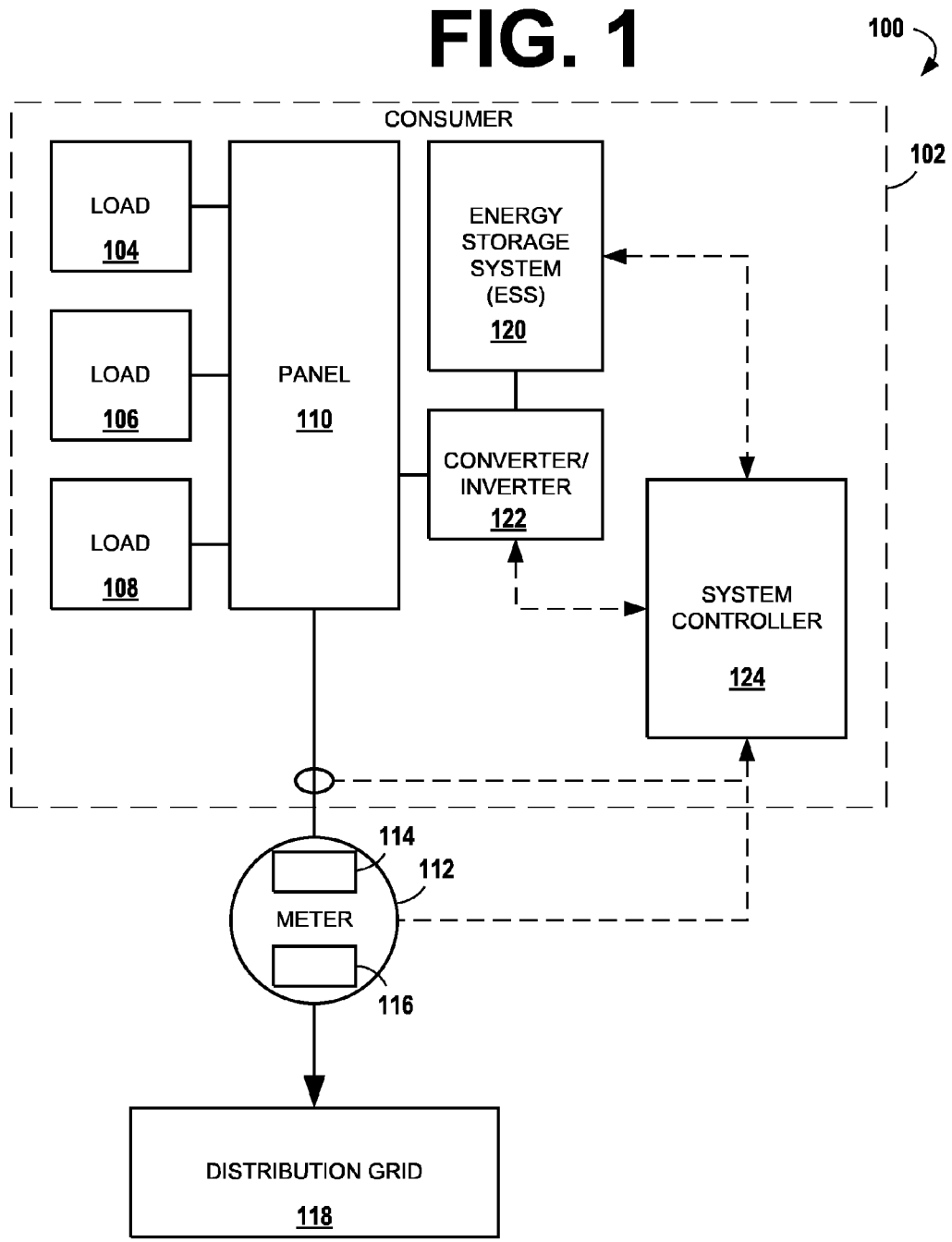
FIG. 1 is a block circuit diagram of a consumption management system at a customer site according to an embodiment of the invention.

An exemplary embodiment of an energy consumption management system at a site is illustrated in FIG. 1. Here, the consumption management system 100 is located at the consumer's site 102 where loads 104, 106, and 108 are connected to an electrical distribution panel 110. A utility meter 112 determines consumption of all loads at the site 102 and comprises a sampling portion 114 for measuring the rate and over-time usage of energy consumption, and an indicator 116 by which these measurements can be communicated to meter reading individuals or transmitted to utility control centers for billing purposes. The meter 112 is placed between the distribution grid 118, over which utility provider power is distributed, and any loads consuming energy at the site 102.

To manage consumption, a consumer may install an energy storage system (ESS) 120 at the site 102. In some embodiments, the ESS is supplemented or replaced by a generator device capable of providing power to the loads. In some embodiments, a converter or inverter 122 is used to convert the energy of the ESS to a form used by a load or by the site in general. For example, if a battery-based ESS is to be connected to the panel 110, and the panel 110 is providing single-phase AC to a load 104, an inverter 122 is used to convert the DC energy stored by the ESS to an AC form usable by the load 104. A system controller 124 may be present to control the ESS 120 and/or converter/inverter 122 according to software or other instructions or methods for controlling when and how energy is exchanged between the ESS 120 and the site 102. These control decisions are made using consumption measurements drawn from a line between the panel 110 and the meter 112, or from the meter 112 itself, when possible. In some embodiments, the controller 124 may draw measurements directly from one or more significant loads at the site 102 instead of, or in supplement to measurement of all the loads at a main line leading to the utility meter 112. Thus the controller 124 will receive a measurement representing the metered (i.e., utility meter-recorded) energy consumption of the site. For this reason the controller 124 is capable of determining and recording current and past metered consumption trends and the effects of using the ESS (and/or generator) on the metered consumption. In some embodiments, the controller 124 is also capable of measuring and recording environmental conditions or conditions of loads at the site 102 that can be correlated with the consumption measurements and records.

An energy storage system (ESS) 120 may be comprised of one or more electrical energy storing devices, including, but not limited to, batteries. Battery modules are described herein as a preferable means for storing and transporting electrical energy, but other equivalent means for storing energy may be used, such as, for example, compressed gas storage, pumped hydro storage, flywheel energy storage, capacitive energy storage, superconducting magnetic energy storage, fuel cell energy storage, other similar devices for energy storage known in the art, and combinations thereof. If the modules are battery-based, the battery types may include rechargeable or non-rechargeable chemistries and compositions, such as, for example, lead-acid, alkaline, secondary lead acid, lithium-ion, sodium (zebra), nickel-metal hydride, nickel cadmium, other energy storage chemistries known in the art, and combinations thereof. Energy storage devices such as these may be comprised of small or large numbers of cells, capacities, voltages, amperages, and other battery properties. They may be configured in unitary or modular designs and may follow standardized guidelines or customized specifications.

The converter/inverter 122 shown may likewise comprise one or more conversion devices including but not limited to boost converters, buck-boost converters, bidirectional inverters, unidirectional inverters, other conversion devices known by those skilled in the art, and combinations thereof.

In an exemplary embodiment, the system controller 124 may comprise a computer including a processor or other processing means, a data store or other data storage means such as a memory chip or memory disk on which processor-executable instructions are or may be recorded. In some embodiments, the memory or data storage is encoded with pricing information about the financial value and costs of charging and discharging the ESS 120. The system controller 124 may also comprise means for measuring electrical consumption of a power line, such as an analog/digital interface or other input/output device. In some embodiments, the system controller 124 comprises a modem or other communications device for sending and/or receiving instructions from another computer means or from an operator that may be remotely located from the controller 124 structures. In some embodiments, the system controller 124 is capable of controlling consumption of one or more loads at the site, thereby having ability to produce load shedding which reduces the overall recorded consumption at the meter 112. A system controller 124 having comparable capabilities to these already described is also envisioned as being within the scope of the invention and embodiments disclosed herein.

Figure 2:
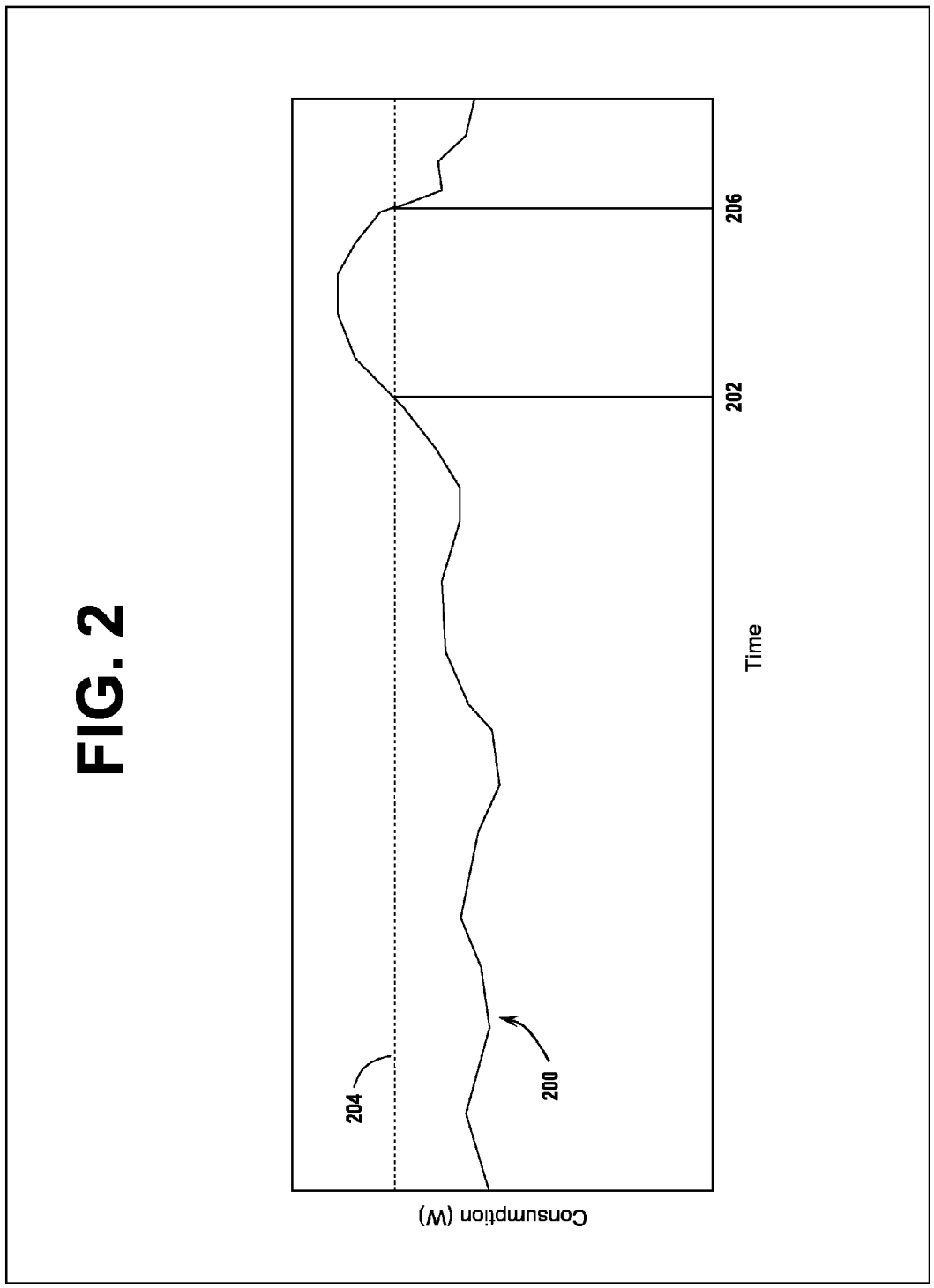
FIG. 2 is a chart showing a utility-metered energy consumption profile of a consumer over time.

FIG. 2 is a chart showing utility-metered energy consumption (in watts) of a consumer over time. The load profile or consumption profile 200 varies over time as the energy drawn by loads at the site varies over time. When time 202 is reached, the profile 200 exceeds a peak consumption level threshold limit 204. Above this threshold limit 204, the load profile 200 is categorized as being in a "peak" condition. The peak ends at time 206 when the load profile 200 drops below the peak consumption level threshold limit 204.

The peak consumption level threshold limit 204 as indicated here represents the rate of consumption that must be exceeded to produce a higher demand charge than the consumer will already be charged. As implied in this figure, the highest recorded demand at the site for demand charge calculation purposes before time 202 is higher than the load profile 200 in general until time 202. Thus, until time 202, no demand charge savings could be realized by the system controller if an ESS or generator provides power to the site or if load shedding is produced, since the load profile would remain lower than the peak threshold limit 204. From time 202 to time 206, however, the system controller may potentially prevent or limit an increase in the demand charge that would otherwise result due to the metered load profile 200 exceeding the peak consumption level threshold limit 204 by use of load shedding and mitigation by the ESS to drive the load profile 200 down toward, to, or below the threshold limit 204. The process of determining whether to mitigate or shed load at that time may be affected by the financial realities of the interaction between the consumption of energy from an ESS and the demand charge that may result in important demand charge management decisions that increase efficiency of using an ESS, maximize the life span of ESS and other system components, and determine whether mitigation is optimal within a billing cycle.

Figure 3:
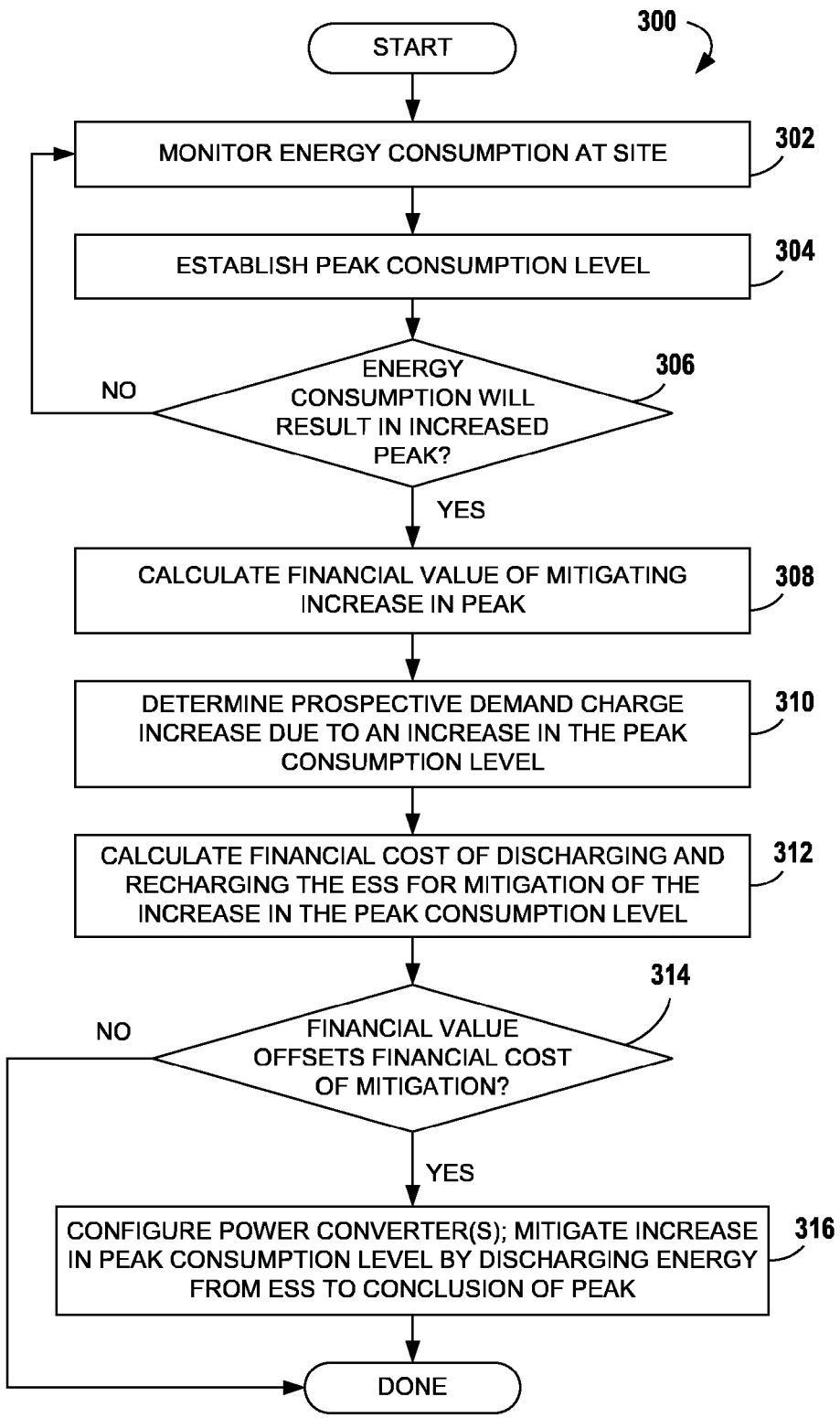
FIG. 3 is a flowchart of an exemplary method of managing electrical energy consumption of a consumer using an energy storage system (ESS) and/or generator according to an embodiment of the invention.

An exemplary method of managing electrical energy consumption of a consumer using an ESS is represented in the flowchart of FIG. 3. In this process 300, the metered energy consumption level is monitored at the consumer's site at step 302. Power consumption may be monitored by a system controller 124 or by another means measuring the metered power consumption over time for the site. As consumption is monitored, a peak consumption level is detected 304. In some embodiments, the peak consumption level is an instantaneous maximum consumption level measured (or a single point of maximum consumption) over the present billing period or other defined period of time, such as the previous 30 days or 36 hours from the present time that power consumption is monitored. In a preferred embodiment, the period of time closely represents the length of time elapsed since the current billing period began so that the controller can gauge the demand charge that will result from the peak consumption level in that billing cycle with greater accuracy and precision. In some embodiments, the peak consumption level is measured directly from the utility meter for the site, but it may be alternatively obtained from an external source, such as a utility provider who is monitoring the consumption and peak consumption of the consumer. In a preferred embodiment, the peak consumption level gradually increases when consumption increases over time, assuming that no mitigation of peak consumption is achieved, until it is reset to zero at the end of a billing period. In some embodiments, the peak consumption level is established as a statistical representative value of the metered demand recorded over a period of time, such that the average consumption of all values measured over 15 minutes or the median consumption value of a set of 15 measurements, wherein one measurement is taken each minute, every five minutes, or at some other regular or arbitrary interval.

After the peak consumption level is established in step 304, the controller continues to monitor energy consumption at the site until the energy consumption level will result in an increased peak consumption level 306. In some embodiments, this step is completed when the consumption of the site exceeds the peak consumption level. In other embodiments, the consumption may have to exceed the peak consumption level for a predetermined length of time, such as for 5 minutes, or by a predetermined magnitude, such as by 100 watts. Smaller or greater divisions of time or magnitudes are considered to be within the scope of the invention as engineering dictates. An advantage of requiring the load profile to exceed the peak for a length of time or by a magnitude is that short or small deviations above the peak consumption level can be ignored, saving wear on the ESS from frequent discharging. In some embodiments this also allows the controller to filter out noise and/or detect with greater accuracy whether the peak consumption level will be affected by the measured load profile. In yet other embodiments, the controller performs an analysis comparing the current load profile to a historical load profile or other representative load profile that is used to estimate and/or forecast the likelihood of the load profile exceeding the peak consumption level (and, potentially, the amount of consumption at which the peak level will be exceeded) during the current billing period or within another predetermined length of time. Such methods are discussed in greater detail in reference with FIGS. 4 and 5.

In some embodiments, the energy consumption level monitored is the overall metered energy consumption of the site, but in other embodiments, step 306 is performed as particular loads are monitored that have an effect on the metered energy consumption of the site, and the controller receives an indication that the consumption of one or more of these monitored loads is (or will be) causing a peak in consumption. For example, the controller may receive indication that an HVAC system will be turning on at a certain time and causing a peak due to the controller receiving a schedule that is input to a thermostat by a person at the site. In another example, the controller may determine via a camera or other sensor that a vehicle is in a parking place with an electric vehicle charging station and that the charger is therefore likely to be used imminently and draw a significant amount of power from the grid.

Figure 4:
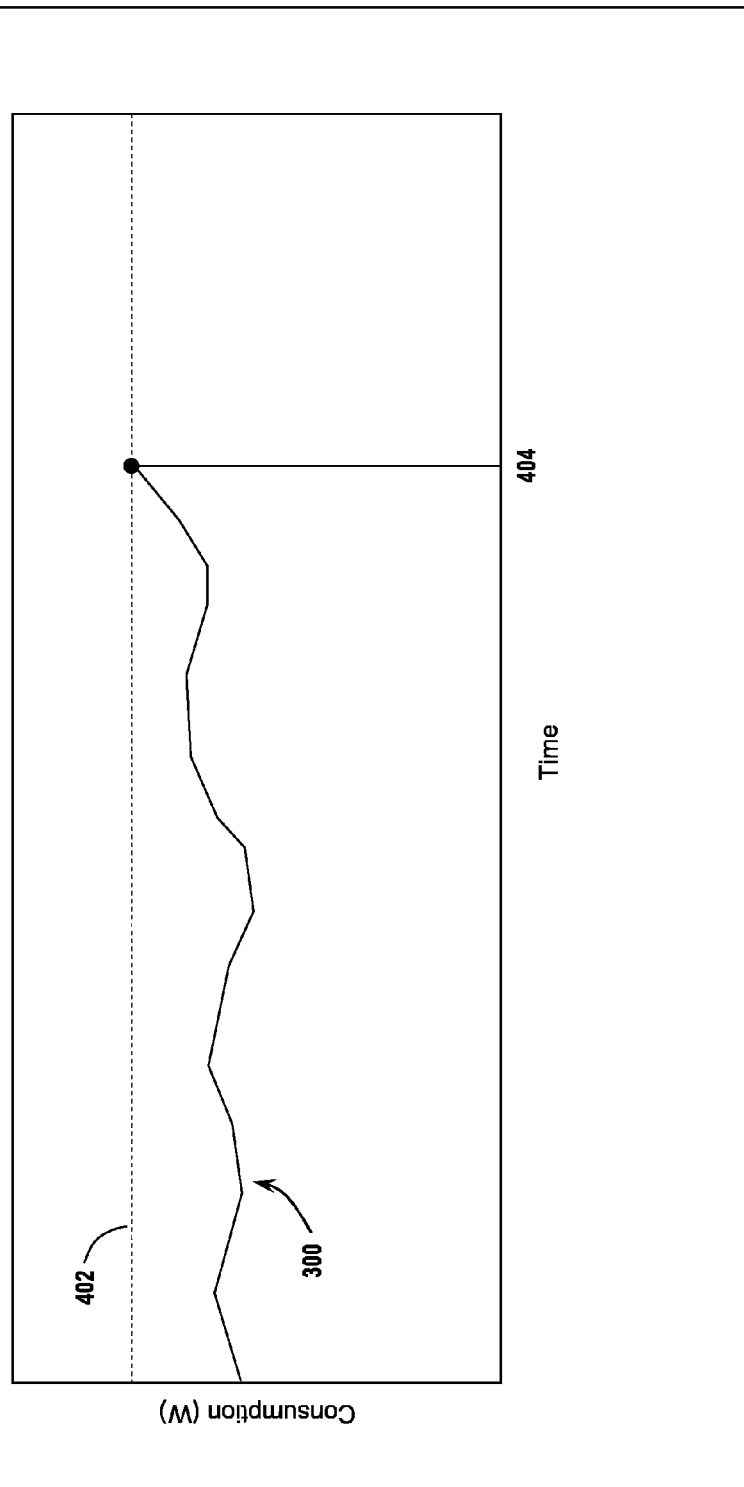
FIG. 4 is a chart showing a profile of the electrical energy consumption of a site over time wherein a peak consumption level is reached.

FIG. 4 is a chart showing a profile 400 of the electrical energy consumption of the site over time. When the profile 400 reaches the peak consumption level 402 at time 404, the system controller detects that a new peak will be formed as the profile rises above the peak consumption level 402. In some embodiments, the peak consumption level is the demand level above which an additional demand charge will be incurred, but in other embodiments, the peak consumption level is a level lower than that demand charge-increasing level such that there is a buffer of time or consumption magnitude between when the profile exceeds the peak consumption level and when the profile actually produces an increased demand charge. FIG. 4 illustrates one potential exemplary embodiment of the invention wherein the energy consumption level of the site will result in an increased peak consumption level, as discussed in step 306 of FIG. 3.

Figure 5:
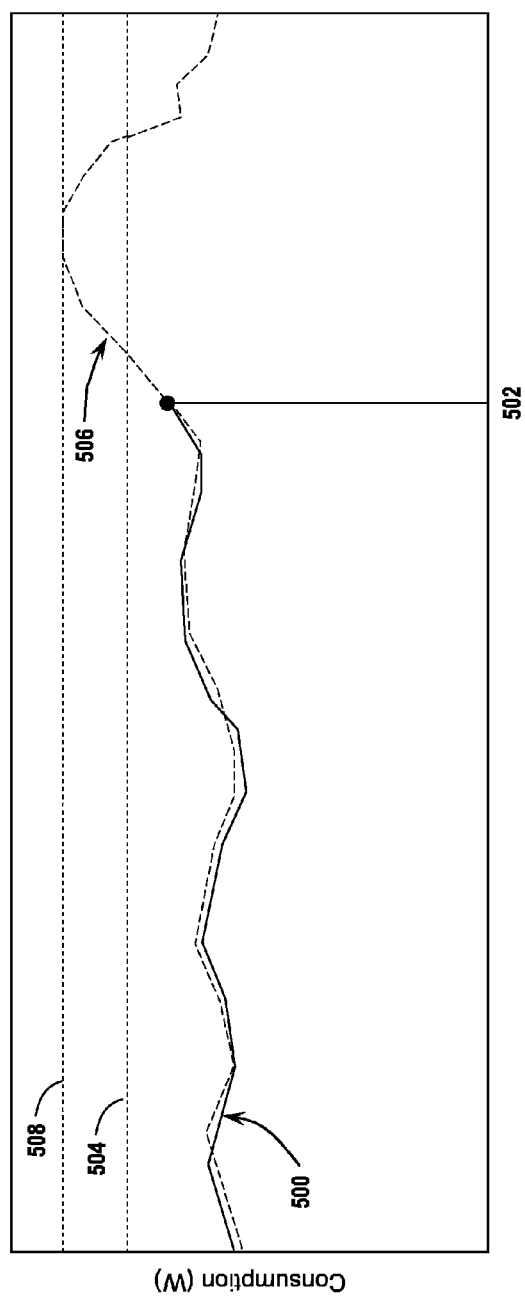
FIG. 5 is a chart illustrating another potential exemplary embodiment of the invention wherein a consumption management system determines that the energy consumption level will result in an increased peak consumption level.

FIG. 5 is a chart illustrating another potential exemplary embodiment of the invention wherein the controller determines that the energy consumption level of the site will result in an increased peak consumption level. Here, the profile (solid line 500) of the electrical energy consumption of the site is monitored over time, as in the previous example. Here, however, the controller determines that the energy consumption level will result in an increased peak consumption level at time 502 before the profile 500 reaches the peak consumption level threshold limit 504 because of the correlation between the profile 500 and an expected profile for the site 506 that has existed up to time 502. Thus, the energy management system is instructed to take action to mitigate consumption before the peak is reached and even though the consumption level at time 502 is less than the current peak consumption level threshold limit 504. An expected profile 506 of this embodiment may be a previously-recorded load profile (preferably for the same site and for a comparable time period) or a generated load profile based on previously-recorded data, environmental conditions at the site that may affect the consumption of the site (such as, but not limited to, temperature correlated with an HVAC system at the site), electrical measurements (such as, but not limited to, current in wires heating the wires, increasing their resistance and thereby leading to increased consumption), or external demands (such as, but not limited to, demand response requests from a utility provider which request the consumer to decrease consumption during particular periods of time). Other means of forecasting load requirements and consumption over time are known in the art and considered within the scope of the invention as described herein.

As a result of the comparison between profile 500 and profile 506, it can be determined with reasonable certainty that profile 500 will rise above the limit 504 and that mitigation actions should be prepared to be deployed or taken immediately to prevent the rise from taking place, if such actions would be efficient to perform. This is one method of detecting that consumption will result in an increased peak consumption limit. An increased peak consumption limit in this sense is a peak consumption level that is higher than the current peak consumption level at any given time.

Referring again to FIG. 3, once the controller determines the energy consumption level of the site will result in an increased peak consumption level (whether immediately, imminently, or eventually), a routine calculates the financial value of discharging the ESS to mitigate an increase in the peak demand in step 308. The financial value calculated at this point comprises at least a determination of the amount of demand charge that is expected to be avoided by discharging the ESS to mitigate the increase in demand charge, as shown in step 310. Step 308 may further include calculation of other financial value produced by discharging the ESS, including but not limited to the value obtained by discharging energy from the ESS to mitigate the peak instead of drawing that energy from the distribution grid and being charged by the utility provider for that energy at that time, the value gained by the consumer by discharging the ESS to result in a sale of energy to the grid or to a utility provider, the value gained by the consumer by discharging the ESS to participate in a demand response program, similar values produced by discharging the ESS, and combinations thereof. In embodiments having a generator means in addition to or along with an ESS, the calculation of financial value may be determined by the value of energy provided by the generator in like fashion, as will be apparent to those skilled in the art.

In performing step 310, the controller determines the prospective increase in demand charge that would be incurred if no discharging or charging of the ESS or generator is performed. For example, consider profile 500 which is monitored by a controller as shown in FIG. 5. At time 502, the peak demand level which will be used to produce a demand charge for the site is level 504. The controller detects that the consumption profile 500 will follow expected profile 506 and result in an increased peak demand level when the actual consumption 500 exceeds level 504. Thus, according to steps 308 and 310 of the process 300, the controller determines the difference between the demand charge resulting from peak demand level 508 and the demand charge already based on peak demand level 504. This determination is part of the overall calculation of financial value to the consumer received by discharging (or charging) the ESS or generator at the site in avoidance of the peak.

In some embodiments step 308 may comprise the calculations performed in step 310 to the exclusion of other factors that could contribute to the financial value, but preferably other financial value calculations are included to increase the accuracy of a total financial value determination.

As another step in the process 300, the controller calculates the financial cost of discharging and recharging the ESS (and/or generator) for mitigation of the increase in the peak consumption level in step 312. The "financial cost" here comprises costs associated with mitigation of the peak, such as, but not limited to, the cost of energy from the distribution grid to recharge energy discharged from the ESS (and/or generator) while mitigating the increase in the peak consumption level. This cost can be calculated in some embodiments by determining the rate of using electrical energy from the grid at the time the ESS will be recharged (e.g., after the peak is mitigated and energy has been discharged from the ESS) and the total energy that will be drawn to recharge the ESS to an operative or predetermined level and then calculating the financial cost of completing the recharge action. Another financial cost that may be included in step 312 is the loss of value of the ESS (and/or generator) that will be accumulated due to its life span being decreased through wear and tear. Many energy storage systems, generator systems, and converter/inverter components have an expected life span of effective cycles of charge/discharge or other uses that is decreased each time they are used. A battery-based ESS is a notable example of this effect, since its lifetime of operation is closely associated with the number of charge/discharge cycles, and numerous charge/discharge cycles can reduce future performance of the system such as by decreasing maximum storage capacity.

In embodiments with a generator-based energy source, the cost of fuel and refueling the generator may be significant parts of the financial cost determinations made.

With the financial value and costs of mitigating the peak calculated, the process 300 determines whether the value offsets the costs at step 314. This may be performed by taking the difference between the value and the costs and if the result is a positive value, the value has offset the costs because the value gained by the consumer in mitigating the peak is greater than the losses that he will incur by doing so. For example, if the value to the consumer of avoiding an increased demand charge is $120 and the costs of mitigating the peak to achieve this avoidance add up to $80, then the positive $40 difference shows that mitigation would be profitable and should take place, so the process continues to step 316. Otherwise, the process would end or restart.

In another embodiment, the consumer may predetermine that the difference between the value and the cost is permitted to fall below zero to some degree while still having the value considered to offset the costs. For example, an environmentally conscious customer may wish to use a battery storage system and/or local generator even if the cost of doing so is not financially efficient, yet a difference that falls outside of the consumer's threshold would still go unaffected by the ESS if not enough of an impact may be achieved.

In other embodiments, the offset may be a weighted difference between the value and the costs. Here, the consumer may provide emphasis to particular values or costs by adding a multiplier to those factors that manipulates the offset calculation. For example, a consumer may wish to temporarily affect the result of the calculation if an old ESS is not performing properly, for testing purposes, or for other reasons. In some cases this may lead the consumer to put less weight on the life span of a converter or battery system by multiplying that cost by a fraction during the offset calculation. Other methods of weighting factors in the offset calculation will be apparent to those skilled in the art and are considered within the scope of these embodiments.

In step 316, the controller configures the power converters and/or inverters and other power conversion components for discharge of the ESS and/or generator and controls the mitigation of the peak when the load profile exceeds the peak consumption level. In some embodiments this includes discharging energy from the ESS until the peak concludes in such a manner that the metered peak consumption level does not rise over the course of the consumption peak. In other embodiments, this includes discharging in such a manner that the metered peak consumption level rises slowly or only to a limited point over the course of the consumption peak, wherein the new peak consumption level at the end of the peak is lower than it otherwise would have been. Step 316 may further comprise determining the permissible discharge rate of the ESS and the allowable peak consumption level, which may be higher than the present peak consumption level determined in step 304. By discharging energy from the ESS and/or from a generator system at the site, the controller manages the amount of energy consumption detected by the utility meter, typically reducing the amount measured thereby, and providing avoidance of increased demand charges. Demand charges are managed at the same time that the costs of monitoring and controlling demand charges are managed, and the consumer is given a better perspective of how the energy consumption management system at the site is producing a positive financial impact in the long run. Furthermore, wasteful, unprofitable, and/or inefficient use of the energy consumption management system is reduced or eliminated.

Non-Avoided Demand Charge Costs

In some embodiments, the financial cost referred to in step 312 (among other places) may include demand charges that are not avoided when the ESS (and/or generator) is discharged. For example, this may be the case when the controller permits the peak consumption level to rise, resulting in an increased demand charge, but the ESS is discharged after the peak consumption level rises to mitigate the remainder of the peak. This scenario may be further described in connection with FIG. 6.

Figure 6:
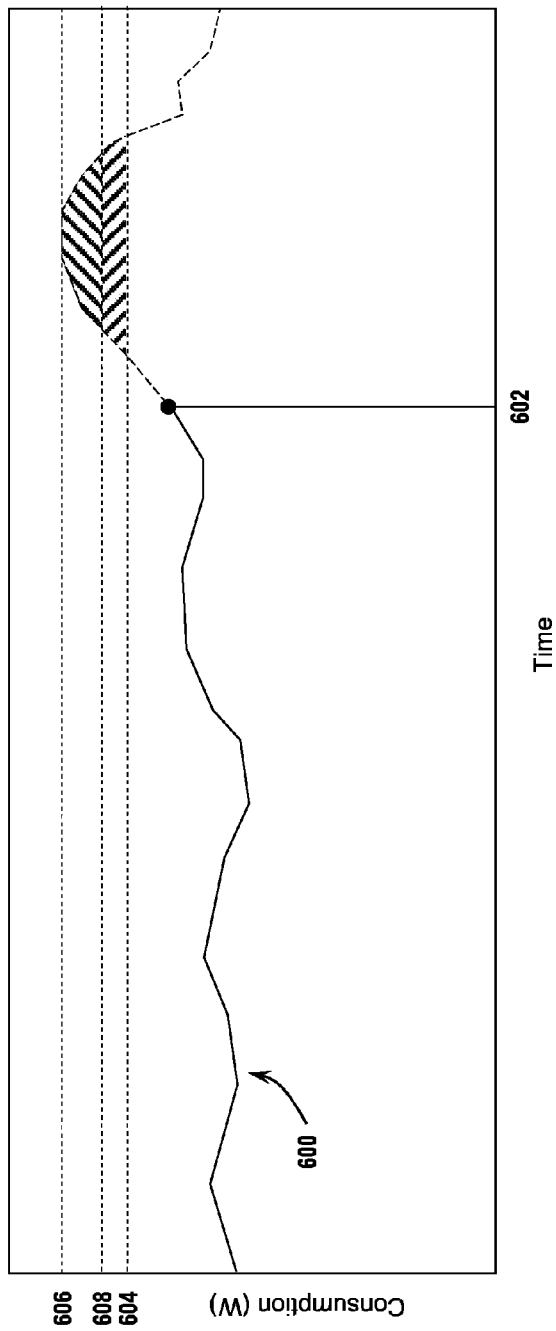
FIG. 6 is a chart showing a load profile of a consumer that is determined to result in a new peak consumption level.

FIG. 6 is a chart showing a load profile 600 of a consumer that, at time 602, is determined to result in a new peak consumption level, such that the current peak consumption level 604 is anticipated to rise to peak consumption level 606. In this embodiment the controller calculates financial value and costs of mitigating the peak to prevent the peak consumption level from rising to level 606. One of the costs it may factor into these calculations is the potential cost of allowing the peak consumption level 604 to rise to a higher peak level 608 between the current peak 604 and the anticipated peak 606. In such a case, the demand charge at the end of the billing cycle is expected to increase in accordance with new peak 608, but a portion of the demand charge is avoided that would correspond to the increase between level 608 and level 606. This scenario may be advantageous in situations where the capacity of the ESS at time 602 is not expected to be sufficient to completely mitigate the peak (i.e. completely keep the peak from increasing above level 604), but is capable of mitigating a portion of the peak.

If the consumption of the site is attempted to be completely mitigated by the ESS in such a situation and the peak consumption level is not allowed to increase, the ESS is likely to become depleted before the end of the peak, becoming useless for mitigating the current peak and future peaks until it is sufficiently recharged, and the peak consumption level will likely increase to level 606 by the end of the peak, so there is little or no benefit realized by the consumer. Thus, in some embodiments the process 300 includes a routine of (theoretically or actually) increasing the peak consumption level, recalculating the financial value and the financial cost of discharging and/or recharging the ESS in light with the increased peak consumption level, and, if the recalculated financial value offsets the recalculated financial costs, discharging the ESS to mitigate the peak at the increased peak consumption level. In some embodiments, the peak consumption level is increased by decreasing the rate of discharge of the ESS. The ESS is therefore discharged at the lower rate of discharge, and there is a decreased risk of the peak going unmitigated. In embodiments where the recalculated financial value does not offset the recalculated financial costs, the peak consumption level is increased further (or the rate of discharge of the ESS is decreased further), and the routine continues until the ESS is discharged, the peak subsides, or the peak consumption level is no longer increasing. By allowing the peak consumption level to incrementally increase, this process efficiently finds the largest amount of avoided increase in demand charge that the ESS can produce and then executes at that level. Doing so preserves ESS lifespan and stored energy for discharging that will achieve the consumer's financial goals without unintentionally producing higher demand charges than are necessary.

Billing Cycle Comparisons

Figure 7:
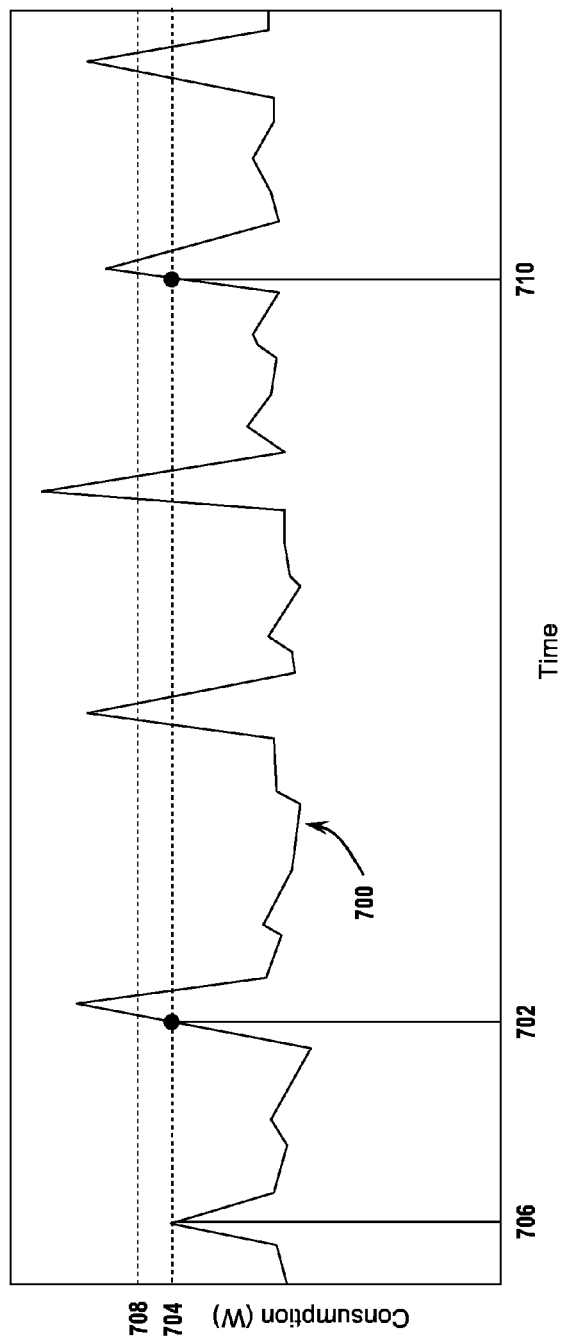
FIG. 7 is a chart of an energy consumption profile of a consumer over a billing cycle.

In some embodiments, calculations of financial value and costs are dependent on the time remaining in a billing cycle. FIG. 7 helps to illustrate this point. It shows a chart of an energy consumption profile 700 of a consumer over time. The total time shown here represents a complete billing cycle from start to finish. At time 702, the load profile 700 reaches the peak consumption level 704 for the billing cycle that was previously established at time 706. In an embodiment having the profile 700 shown here, which has periodic peaks in consumption, the calculation of financial value by the controller may determine (1) that the ESS has insufficient capacity to mitigate all of the remaining peaks in the billing period and therefore there would be no financial value gained in trying to mitigate the peak at time 702 because one or more later peaks would likely negate any demand charges avoided by discharging at time 702, or (2) that the peak consumption level should be allowed to rise to level 708, a peak consumption level that is higher than level 704, because it is predicted and anticipated that the ESS will have sufficient capacity to mitigate the remaining peaks if the peak consumption level is redefined to a higher point. Defining a higher peak consumption level such as level 708 reduces the energy storage capacity needed to completely mitigate a peak to that new level, as discussed in more detail in connection with FIG. 6. Here, however, the mitigation events of multiple peaks over the billing period are considered collectively in determining whether to discharge at time 702. The financial value achieved by keeping the peak consumption level at level 708 is less than the value that would be obtained at level 704, but over the course of the billing period, it may be more effective in the end to allow the peak consumption level to rise or the ESS may be depleted when a peak appears. If, however, it is anticipated that the ESS will be able to recharge between mitigation events, and that the ESS has the capacity to completely mitigate the peaks when needed, then the peak consumption level can be held at level 704 for the remainder of the billing cycle.

In an embodiment where the profile 700 has reached time 710, there is less time remaining in the billing cycle, and therefore less chance of the ESS being depleted when it is needed to mitigate a peak. Therefore the controller is more likely to find that the peak consumption level 704 does not need to be increased to level 708. Another way to reach this result is to determine that since the ESS has been capable of mitigating peaks and maintaining level 704 until time 710, the confidence level of the controller that it will be able to mitigate remaining peaks in the billing cycle is greater than at the start. In another embodiment, the performance of the ESS in previous billing cycles is used in a confidence factor to determine a confidence level that the ESS will be able to mitigate in the current billing cycle, and that factor is used in determining the financial value that will be gained in mitigation (and therefore is used in determining whether the value offsets the costs of mitigating).

In some embodiments, a confidence factor takes into account patterns such as the recorded frequency of occurrence and/or the magnitude of peaks in consumption at the site. If the frequency or magnitude of the peaks is high, the confidence of mitigating using the ESS at a specified peak consumption level is lower than the confidence at a higher peak consumption level.

In an exemplary embodiment, a confidence factor is:

$$C_1 = \frac{(f)(M)(q_{ess})(PCL)}{t_{charge}}$$

Wherein confidence ($C_1$) is proportional to the frequency of peaks (f), magnitude of those peaks (M), the charge remaining in the ESS ($q_{ess}$), and the current or projected peak consumption level (PCL), and inversely proportional to the time that the ESS requires to recharge after mitigating a peak ($t_{charge}$). In this way, a confidence factor can be determined for a variety of situations and the controller can determine whether mitigation will have sufficient value to the consumer based on the value of $C_1$ calculated and how it is used in weighting the cost and value of mitigating a peak. With a confidence factor, the controller takes into account historical conditions (such as f, M, and/or $t_{charge}$) and present conditions (such as $q_{ess}$, PCL, and/or $t_{charge}$) to make a better decision of whether the value gained by mitigating a peak will offset the costs associated therewith.

In another embodiment, a confidence factor is augmented to take into account time remaining in the present billing cycle:

$$C_2 = \frac{(f)(M)(q_{ess})(PCL)}{(t_{charge})(t_{billing})}$$

Wherein confidence ($C_2$) is also inversely proportional to the time remaining in the billing period ($t_{billing}$), such that a low amount of time remaining increases confidence that the ESS will be able to maintain the current peak consumption level.

These confidence levels may be used in some embodiments as weighting factors when calculating the difference between value and costs, such as are described in detail with step 314 of FIG. 3. Other methods and means of determining, forecasting, and reacting to future consumption needs for a facility are discussed in United States Patent Application Publication Number 2005/0043862 (application Ser. No. 10/942,780), "Automatic Energy Management and Energy Consumption Reduction, Especially in Commercial and Multi-building Systems," by Brickfield et al., which is hereby incorporated by reference in its entirety.

MISCELLANEOUS DEFINITIONS AND SCOPE INFORMATION

Some methods and systems of the embodiments of the invention disclosed herein may also be embodied as a computer-readable medium containing instructions to complete those methods or implement those systems. The term "computer-readable medium" as used herein includes not only a single physical medium or single type of medium, but also a combination of one or more tangible physical media and/or types of media. Examples of a computer-readable medium include, but are not limited to, one or more memory chips, hard drives, optical discs (such as CDs or DVDs), magnetic discs, and magnetic tape drives. A computer-readable medium may be considered part of a larger device or it may be itself removable from the device. For example, a commonly-used computer-readable medium is a universal serial bus (USB) memory stick that interfaces with a USB port of a device. A computer-readable medium may store computer-readable instructions (e.g. software) and/or computer-readable data (i.e., information that may or may not be executable). In the present example, a computer-readable medium (such as memory) may be included to store instructions for the controller to manage the charge and discharge of the ESS and/or control other components of a consumption management system.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

In addition, it should be understood that the figures described above, which highlight the functionality and advantages of the present invention, are presented for example purposes only and not for limitation. The exemplary architecture of the present invention is sufficiently flexible and configurable, such that it may be utilized in ways other than that shown in the figures. It will be apparent to one of skill in the art how alternative functional, logical or physical partitioning and configurations can be implemented to implement the desired features of the present invention. Also, a multitude of different constituent module or step names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Additionally, the various embodiments set forth herein are described in terms of exemplary block diagrams and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "typical," "conventional," "traditional," "normal," "standard," "known" and terms of similar meaning should not be construed as limiting the time described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated or context dictates otherwise. Similarly, a group of items linked with the conjunction "or" should not be read as requiring mutual exclusivity among that group, but rather should also be read as "and/or" unless expressly stated or context dictates otherwise. Furthermore, although items, elements or component of the invention may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

Further, the purpose of the Abstract is to enable the U.S. Patent and Trademark Office and the public generally, and especially the scientists, engineers, and practitioners in the art who are not familiar with patent or legal terms or phraseology to determine quickly from a cursory inspection the nature and essence of the technical disclosure of the application. The Abstract is not intended to be limiting as to the scope of the present invention in any way.

What is claimed is:

1. A method of managing electrical energy consumption of a consumer, the method comprising:
   determining that an energy consumption level of a site will prospectively result in an increase to an average consumption level of the site in a division of time of a billing cycle comprising a plurality of peaks in consumption;
   calculating a financial value of discharging an energy source at the site during the billing cycle to prospectively mitigate the increase in the average consumption level, the financial value being weighted by a first factor, a second factor, and a third factor, the first factor representing at least one demand charge increase prospectively avoided by mitigating the increase in the average consumption level, the second factor being inversely related to a time required to replenish the energy source after mitigating the increase to the average consumption level, and the third factor representing a frequency of occurrence of the plurality of peaks in the billing cycle;
   calculating a financial cost of prospectively mitigating the increase in the average consumption level;
   providing energy from the energy source to mitigate the increase in the average consumption level when the financial value at least offsets the financial cost.

2. A method of managing electrical energy consumption of a consumer, the method comprising:
   determining that an energy consumption level of a site will prospectively result in an increase to a maximum consumption level of a billing period, the billing period comprising at least a plurality of days;
   calculating a financial value of discharging an energy source at the site during the billing period to prospectively mitigate the increase in the maximum consumption level and representing a cost of discharging the energy source, wherein the financial value is proportional to a first factor representing at least one demand charge increase prospectively avoided by mitigating the increase in the maximum consumption level, and wherein the financial value is proportional to a second factor being inversely related to a time required to replenish the energy source after mitigating the increase to the maximum consumption level and inversely related to a time remaining in the billing period, and wherein the financial value is proportional to a frequency of occurrence of peaks in consumption in the billing period;
   calculating a financial cost of prospectively mitigating the increase in the maximum consumption level;
   providing energy from the energy source to mitigate the increase in the maximum consumption level when the financial value at least offsets the financial cost.

3. The method of claim 2, wherein the peaks in consumption are peaks in the energy consumption level of the site.

4. The method of claim 2, wherein the second factor is proportional to a magnitude of peaks in the energy consumption level.

5. The method of claim 2, wherein the second factor is proportional to an amount of charge remaining in the energy source.

6. The method of claim 2, wherein the second factor is proportional to a current or projected peak consumption level.

7. The method of claim 2, wherein the second factor (C), $$C = \frac{(f)(M)(q_{ess})(PCL)}{(t_{charge})(t_{billing})},$$

with f representing a frequency of peaks in the energy consumption level, M representing a magnitude of peaks in the energy consumption level, $q_{ess}$ representing an amount of charge remaining in the energy source, PCL representing a current or projected peak consumption level, $t_{charge}$ representing the time required to replenish the energy source after mitigating the increase to the maximum consumption level, and $t_{billing}$ representing the time remaining in the billing period.

* * * * *